Feb. 3, 1942.    J. R. PARSONS    2,271,845
PROCESS FOR MAKING POROUS MATERIAL
Filed Dec. 9, 1937
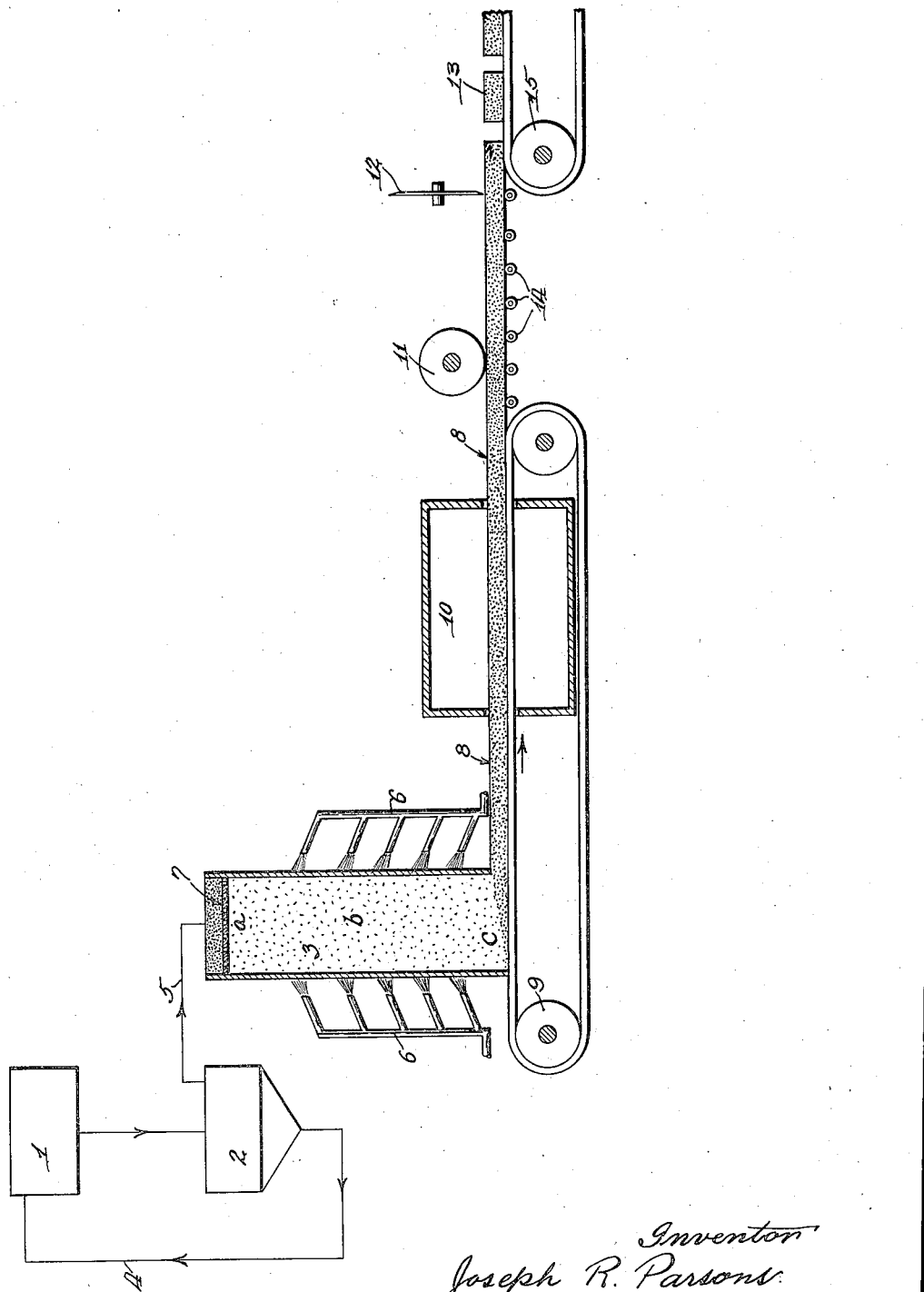
Inventor
Joseph R. Parsons
By Anns, Thies, Olsen & Mecklenburger
Attys.

Patented Feb. 3, 1942

2,271,845

UNITED STATES PATENT OFFICE 2,271,845

PROCESS FOR MAKING POROUS MATERIAL

Joseph R. Parsons, Gypsum, Ohio, assignor to United States Gypsum Company, Chicago, Ill., a corporation of Illinois Application December 9, 1937, Serial No. 178,872

9 Claims. (Cl. 106—55)

This invention relates to porous products and to processes and apparatus for making the same. More particularly this invention relates to processes of producing lightweight, porous ceramic materials useful for sound and heat insulation as well as other industrial uses.

According to general practice, ceramic ware is produced by incorporating water with clay or other argillaceous materials. The mixture is thoroughly milled and pugged until the desired plasticity is obtained. The clay is then molded into shape, dried and subsequently fired. One of the important cost factors in the ceramic industry is the milling and pugging costs. The colloidal nature of the clay material renders the molded clay mass very difficult to dry, and uneven shrinkage and warping of the molded article often occurs. Thus, in general practice and in spite of all efforts of the operator, a large percentage of the product must be discarded as culls. The methods that have been previously used for the production of lightweight ceramic materials are similar to that indicated above. Usually, however, a combustible material such as sawdust, naphthalene, or other organic material is incorporated into the molded clay mass. The combustible material is then burned out during the firing, and voids are left in the product. Gas-liberating substances are also sometimes incorporated with the clay in order to lend porosity to the resulting product. Porous materials produced by this method are even more difficult to dry and fire properly than ordinary ceramic ware, since the voids present in the material act as heat insulators and pockets for moisture present in the material.

It is an object of this invention to proivde a new lightweight porous material, which is particularly useful for heat and sound insulation, filter media, etc., and processes and apparatus for producing the same. The processes embodying this invention are particularly useful for the production of porous ceramic ware by a dry method, thus avoiding the high cost of pugging and decreasing the loss due to waste.

A further object of this invention is to provide a process for the production of a new porous lightweight material in which the slow and tedious method of firing the product is eliminated.

A still further object of this invention is to provide a new lightweight porous material which may be produced from the culls obtained in conventional processes for producing ceramic ware.

A further and additional object of this invention is to provide a continuous process for the production of lightweight ceramic ware.

These and other objects of this invention will become apparent to those skilled in the art upon examination of the accompanying drawing and consideration of the following detailed description.

In general the product of this invention may be prepared in the following manner:

Ceramic materials such as clay, waste firebrick or fire clay, and the like, or other raw materials, are subjected to drying and grinding or comminuting in order to reduce the material to fine particles. The particles are then passed through a furnace, preferably in gaseous suspension. The temperature of the furnace and the time allowed for the particles to remain therein are calculated to allow the surfaces of the individual particles to come into a fused or molten state. The interior of the particles remains solid or in such a condition that the particles will not flow together to any marked degree when contacted with each other. The particles are collected in a zone of the furnace in a mass, each particle adhering to one or more of the others by virtue of their respective fused surfaces. The mass is subsequently cooled, resulting in a highly porous and lightweight ceramic material that is useful in building construction, as for sound and heat insulation, and also as filter media, ceramic ware, etc.

Ceramic materials that may be utilized in preparing the product of this invention are clay and other argillaceous materials such as porcelain clay, china clay, firebrick clay, siliceous clays, other brick clays, and the like. Burned firebrick and other clay products may also be employed.

It is desirable in preparing the product of this invention to utilize fine particles of raw materials of substantially the same size, since a larger surface area of particles is exposed and a greater space is occupied than by a corresponding amount of more coarsely ground material of varying particle size. In order further to increase the space between the particles, the addition of fluffing agents such as asbestos or mineral wool, cyanite, and the like is also within the scope of this invention. The fluffing agents may act to further separate the particles either by holding the particles apart mechanically or by liberating gas during the formation of the porous mass, thus increasing the size of the voids between the particles. A material of this type can be introduced into the ceramic material before or after grinding in suitable mills of conventional types such as ball mills, etc. The type of fluffing agent used generally depends upon the final temperature at which the insulating material is to be put into service. For low temperature work, asbestos or mineral wool works very satisfactorily. For higher temperatures, there are a number of needle-like crystals from which the material can be selected. For instance, cyanite has a needle-like crystalline structure which not only aids in fluffing but also on heating expands, which greatly aids in lightening the mass. Other suitable mineral fluffing agents are vermiculite, crystalline pyrophyllite, andalusite, sillimanite, and silica, the latter preferably at or above 500° C., at which temperature it has an expanding effect. Gas-producing or gas-liberating materials such as gypsum may be incorporated into the dry mix which, when exposed to the high temperature, will volatilize and form cellular structures within the mass.

Furthermore, to accelerate the softening of the surfaces and subsequent bonding action, a flux which is easily vaporizable, such as sodium chloride, may be introduced into the furnace either separately or mixed with the particles of the ceramic material. The advantage of using a flux is that the clay grains or ceramic materials used do not have to be heated to temperatures approaching their normal melting point before they will fuse. Thus, lower temperatures may be used upon the flux-coated ceramic or clay grain to obtain a fusing effect. However, if the insulating material is to be used at extremely high temperatures, it is preferable that no fluxing ingredient be added during the production of the insulating ceramic product.

The accompanying drawing illustrates diagrammatically one preferred embodiment of the invention. The process indicated therein is given by way of example only, and it is not intended that the product and process of this invention be limited in any way thereby.

In the embodiment illustrated the raw materials comprising the ceramic material, with or without fluffing or fluxing agents, are introduced into any suitable grinder 1 which comminutes the material to very fine particles. If a flux and fluffing agent are used, suitable proportions by weight of the raw material have been found to be:

| | Per cent |
|---|---|
| Burned fire clay | 88 |
| Asbestos | 10 |
| Sodium chloride | 2 |

The ground material is subsequently passed into a separator and dryer 2, of conventional design, or directly into a furnace 3. In the dryer-separator 2 the fines are separated from the oversize particles and dried, if necessary, by any suitable method. This is usually accomplished by passing a current of air through the apparatus 2, the fine particles being removed in air suspension and the oversize particles settling to the lower regions of the apparatus. The oversize particles may be returned to the grinder 1 by any suitable means 4, and the fines are introduced by any suitable means 5 into the furnace 3 heated preferably externally by burners 6 or other means. The furnace 3 may include a sifting device 7 through which the fine particles may be passed in order to distribute them evenly in the furnace and sift out oversize particles. The fine particles introduced into the furnace 3 are allowed to settle to the bottom of the furnace by force of gravity. During settling, the particles pass through three temperature zones of the furnace 3: a preshrinking zone a, in which the ceramic matter is preshrunk and traces of water are removed; a surface softening or fusing zone b, in which the surface of each particle is fused under the intense heat supplied by the burners 6; and a bonding zone c, where the particles finally collect and become bonded together by virtue of their fused surfaces. For each type of raw material used, the temperature, the size of the particles and the time which is required for the particles to pass through the softening zone may vary widely and may be carefully controlled with respect to each other. Thus, too low heat for too short a time may not allow the surfaces of the particles to soften and the particles may not be bound together on entering the bonding zone; and, if the temperature is too high, the particles may soften and become liquid throughout and fuse completely, thus forming a solid nonporous mass in the bonding zone. The temperature in the bonding zone c is somewhat less than that in the surface-softening zone b in order that the particles will bond together; and, in the embodiment shown, it is here that the solid porous material 8 is formed.

The porous material 8 may be removed from the bottom end of the furnace intermittently or, as indicated in the diagram, by a continuous method such as a continuous conveyor 9. It should be noted that the material 8 itself acts as an insulator to the conveyor 9 when the latter is passing through the intense heating zone of the firing furnace 3. Thus the need for expensive refractories to protect the conveyor 9 is avoided, and a number of problems involving insulation of the conveyor and the conveying equipment are diminished. The material, which in this case is a continuous sheet 8, is preferably passed through an annealing oven 10 after leaving the firing furnace 3 in order to remove whatever strains might be in the product 8.

The solid porous mass 8 after being removed from the annealing oven 10 may be treated in a variety of ways, depending upon the desired use of the product; for example, the edges may be smoothed off and trued up by means of a grinding wheel or wheels, the upper one of which is indicated at 11 in the drawing. In the continuous process the sheet of porous material coming from the annealing oven 10 may be cut into any desired length by a carborundum saw 12 or other suitable method to form bricks 13 or other units. Rollers and a second conveyor are indicated at 14 and 15, which may be used for transporting the porous sheet 8 and bricks 13.

Though the drawing illustrates the production of an insulation brick by this method, it is apparent that other ceramic ware can be produced likewise. For instance, the conveyor can be provided with a plurality of molds which may pass continuously through the furnace or be allowed to remain in the receiving chamber for a sufficient length of time until the proper thickness of material is deposited thereon; for example, a plate mold may be inserted in the bonding zone and retained there until a sufficient amount of the softened ceramic body is allowed to accumulate and bond together to the desired thickness. The mold together with its deposit may then be forwarded to the annealing furnace to remove whatever strains are present. The resulting product may then be treated in any desirable manner such as cutting it into desirable forms or passing it through a ceramic enameling spray vat, in accordance with conventional practice.

In utilizing the conveyor or molds to carry away the hot porous ceramic body from the firing furnace, it is preferred to sprinkle or cover the conveyor with silica sand or some other material that will prevent the sticking of the hot ceramic body to the conveyor or mold itself.

In order to obtain a product of maximum porosity it is usually preferable to control the grinding, separating and sifting of the ceramic particles introduced into the furnace so that they are all substantially of the same size. The presence of both relatively large and small particles in the original raw material will generally result in a product of decreased porosity due to the tendency of the smaller particles to become lodged in between the larger particles.

In burning ordinary clay products to produce a lightweight ceramic body, the time required for burning is directly proportional to the size, shape and shrinkage required in the final product. Therefore, another advantage of this invention is to eliminate the slow and tedious method of firing ceramic ware by burning. The clay grains are shrunk individually while in suspension in a period of a few seconds at extremely high temperatures. Thus the size and shape of the finished product is not altered after the porous product is formed. In some operations it has been found desirable to preburn the entire mass, grind it, and then refluff it as it enters the furnace. By this operation the size and type of furnace usually can be decreased considerably.

In place of clay or ceramic grains, silica sand and certain other refractory materials can be bonded in the same manner. Of course, the temperatures used for these materials are usually very high, and the furnace may be modified accordingly to produce the desired result.

While a particular embodiment of this invention is shown above, it will be understood, of course, that the invention is not to be limited thereto, since many modifications may be made, and it is contemplated, therefore, to cover by the appended claims any such modifications as fall within the true spirit and scope of this invention.

The invention herein claimed is:

1. A process for the production of a porous material of the character described which comprises subjecting a mass of individual substantially nonporous particles in substantially noncontacting relationship to a temperature sufficient to fuse the surfaces of the individual particles and subsequently contacting said fused-surfaced particles to form a solid mass whereby said particles upon cooling are integrally bonded together at their points of contact to form a porous mass.

2. A process for the production of a porous material of the character described which comprises subjecting a mass of individual, finely divided particles in gaseous suspension to a temperature sufficient to fuse the surfaces only of said particles and subsequently contacting said fused-surfaced particles to form a solid porous mass.

3. A process for the production of a ceramic material of the character described which comprises fusing the surfaces of individual solid ceramic particles in a gaseous suspension by the application of heat and collecting said particles into a solid porous mass whereby they are bonded together by fusion at their points of contact.

4. A process for the production of a ceramic material of the character described which comprises fusing the surfaces of individual ceramic particles in gaseous suspension by the application of heat and in the presence of a fluxing agent and allowing said surface fused particles to collect on a surface whereby they come into contact with each other and bond by fusion at their respective points of contact.

5. A process for the production of a porous ceramic material which comprises comminuting ceramic material to fine particles, incorporating therewith a fluxing agent and a fluffing agent, subjecting said particles in gaseous suspension to a temperature sufficient to allow the surfaces only of said particles to become fused and bringing said particles into contact with each other so that the particles form fused bonds with each other at points of contact.

6. A process of preparing a porous, fire-resistant, mineral product which comprises passing finely divided fusible mineral particles in gaseous suspension through a heating zone, the temperature of said zone and the time of passage of particles therethrough being regulated to fuse only the surfaces of said particles, collecting the particles on a surface in a mass whereby they become bonded together at their fused points of contact, and cooling the mass to form the desired product.

7. A continuous process of preparing a porous, fire-resistant, mineral building material which comprises introducing finely divided fusible mineral particles into the upper end of an elongated vertically extending heating zone, passing said particles in gaseous suspension through said zone to the bottom thereof by gravity settling, the temperature of said zone and the time of passage of particles therethrough being regulated to fuse only the surfaces of said particles, collecting the particles on a continuously moving surface in a mass whereby they become bonded together at their fused points of contact, continuously passing the resultant slab through an annealing zone, and cooling to form the desired product.

8. A process of preparing a porous ceramic material which comprises passing finely divided ceramic particles in gaseous suspension through a heating zone, the temperature of said zone and the time of passage of particles therethrough being regulated to fuse only the surfaces of said particles, collecting the particles on a surface in a mass whereby they become bonded together at their fused points of contact, and cooling the mass to form the desired product.

9. A process of preparing a porous ceramic material which comprises introducing finely divided ceramic particles into a heating zone, passing said particles through said zone in gaseous suspension, the temperature of said zone and time of passage through said zone being regulated to permit the fusion of only the surfaces of the individual particles, collecting the particles on a surface in a mass whereby they become bonded together at their fused points of contact, annealing the mass, and finally cooling the same to form the desired product.

JOSEPH R. PARSONS.